Patented Aug. 1, 1933

1,920,492

UNITED STATES PATENT OFFICE 1,920,492

THERAPEUTIC SILICA COMPOUNDS AND METHOD OF MAKING THE SAME

Rudolf Zellmann, Radebeul near Dresden, Germany, assignor to Chemische Fabrik von Heyden, A. G., Radebeul near Dresden, Germany, a Corporation of Germany No Drawing. Continuation of application Serial No. 327,197, December 19, 1928, and in Germany February 18, 1925. This application December 19, 1928. Serial No. 327,196

6 Claims. (Cl. 167—72).

This application is a continuation of my contemporaneously filed application 327,197 relating to therapeutically highly effective silica compounds, such as obtained by coating silica-gel, obtained in any of the well known ways, with a metal, or a salt of the same difficulty soluble in water.

In this appication I shall describe how I operate to make similar therapeutically highly effective silica compounds by acting upon a colloidal solution of silica, obtained in any of the well known ways, with colloidal substances, such as a colloidal metal, a colloidal metalloid, or a colloidal metal salt.

In the following examples I shall describe a very simple method of how I may obtain my new therapeutically highly effective silica compounds. In preparing the same I may start from colloidal silica solution as obtained for instance by dialysis. If one mixes such a colloidal silica solution with a solution of silver nitrate and adds then sodium chloride solution or hydrochloric acid, then one obtains a colloidal solution of silver-chloride. If this solution is evaporated in a flat pan, opaque laminations are obtained which upon investigation under the microscope prove optically entirely homogeneous so that it appears that the silver-chloride is contained in colloidal form in the silica-gel.

Indeed the new compounds prepared according to the present application are solid colloidal solutions of metals, metalloids or compounds of the same in colloidal silica.

I may operate in a different manner insofar as to admit a colloidal solution of silver chloride to the colloidal solution of the silica, or I may dissolve in the silica solution solid colloidal silver-chloride, for instance such protected by albumen. In a similar manner I may incorporate a metalloid, such as sulfur, into the colloidal silica solution.

The new colloidal compounds may be obtained in dry state by drying or evaporating at ordinary or at reduced pressure.

In the operation of my invention I proceed about as described in the following examples:

Example 1

I mix 5 liters of a 3.5% colloidal solution of silica with 50cc of a 1% colloidal gold solution. Upon evaporating the solution mixture one obtains laminations of glass-like appearance and of a reddish violet color.

Example 2

3 liters of a 3% colloidal solution of silica are mixed with 25cc of a 1% gold chloride solution; the mixture is then heated and the gold-chloride reduced by adding a few drops of a hydrazine-hydrate solution. The evaporation of the solution yields laminations of purple color.

Example 3

I admit into a colloidal solution of silica some sulfur dioxide in the form of its aqueous solution and introduce then hydrogen-sulfide into the mixture, whereupon the solution is evaporated. Instead of operating thus, I may add a solution of sulfur, obtained by the reaction of $H_2S$ upon $SO_2$, into the colloidal silica solution and otherwise proceed as described sub 1-3.

Example 4

Instead of starting from pure solutions of colloidal silica as obtained by dialysis one can also use crude solutions as obtained by mixing waterglass with acids. For instance 65 liters of diluted hydrochloric acid of about 6.7° Bé. are mixed with 125 liters of an aqueous solution containing 45 liters of waterglass of 36-38° Bé. To this mixture a solution of 0.5 kg. arabic gum in 5 liters of water is added. Now the mass is well agitated and a solution of 110 g. silver-nitrate in 5 liters of water is added. After 3 days the mixture has become a gelatine-like mass, which is washed with water, pressed off, dried and pulverized.

Silica-gel containing silver instead of silver-chloride is made in a similar way by adding a reducing agent in order to transform the silver-salt into metallic silver. From the description of the physical properties of the products obtained by the operation of the Examples 1 to 4, inclusive, it is obvious that the colloidal metal, or metal compound, or sulfur, is actually dissolved in the silicic acid. I want to emphasize specifically that the products are not merely mixtures of the metals with silicic acid, or merely adhere to the surface of the silicic acid. As already stated, they are more than that; for instance, the product obtained by Example 1, consisting of colloidal silicic acid and colloidal gold, represents a genuine solution of gold. Even if examined under a microscope of the highest power one cannot detect any solid particles of gold because the product is an absolutely homogeneous mass; it has the nature of a glass, for it is perfectly transparent and has the colloidal gold dissolved in its body similarly to the well known rubin-glasses.

In conformance with the physical form of the product of my invention the same may be used both externally and internally; in the form of laminations it may very advantageously be used for the disinfection of any external wounds and in the form of powder, for instance, if produced by Example 4, it may be used externally as a dusting powder for the disinfection of wounds or it may be used internally for the disinfection of the intestines.

What I claim is:

1. The method of preparing solid therapeutically effective compounds, said method comprising mixing an aqueous solution of a colloidal inorganic substance selected from a group consisting of colloidal metals and of colloidal metal salts with an aqueous solution of silica sol and evaporating the homogeneous mixture to dryness.

2. The method of preparing solid therapeutically effective compounds, said method comprising mixing an aqueous solution of colloidal silver with an aqueous solution of silica sol and evaporating the homogeneous mixture to dryness.

3. The method of preparing solid therapeutically effective compounds, said method comprising mixing an aqueous solution of colloidal silver chloride with an aqueous solution of silica sol and evaporating the homogeneous mixture to dryness.

4. As a new article of manufacture, a therapeutically effective silica compound in solid form, consisting of a dry residue of a homogeneous mixture of an aqueous solution of an inorganic substance, selected from a group consisting of colloidal metals and colloidal metal salts, with an aqueous solution of silica sol.

5. As a new article of manufacture, a therapeutically effective silica compound in solid form, consisting of the dry residue of a homogeneous mixture of an aqueous solution of colloidal silver with an aqueous solution of silica sol.

6. As a new article of manufacture, a therapeutically effective silica compound in solid form, consisting of the dry residue of a homogeneous mixture of an aqueous solution of colloidal silver chloride with an aqueous solution of silica sol.

RUDOLF ZELLMANN.